United States Patent [19]

Harwood et al.

[11] Patent Number: 4,618,882

[45] Date of Patent: Oct. 21, 1986

[54] DIGITAL CORRELATION INDICATOR AND HANGING DOT REDUCTION SYSTEM EMPLOYING SAME

[75] Inventors: Leopold A. Harwood, Bridgewater; Danny Chin, Plainsboro; Kirk A. Law, East Windsor, all of N.J.

[73] Assignee: RCA Corporation, Princeton, N.J.

[21] Appl. No.: 724,555

[22] Filed: Apr. 18, 1985

[51] Int. Cl.$^4$ .......................... H04N 9/64; H04N 7/18
[52] U.S. Cl. ...................................... 358/31; 358/36; 358/105; 328/162
[58] Field of Search ...................... 358/31, 36, 37, 13, 358/105, 329; 307/440, 445; 328/162, 157; 364/724

[56] References Cited

U.S. PATENT DOCUMENTS

| | | | |
|---|---|---|---|
| 4,050,084 | 9/1977 | Rossi | 358/31 |
| 4,214,263 | 7/1980 | Kaiser | 358/105 X |
| 4,241,363 | 12/1980 | Maeyama et al. | 358/36 |
| 4,340,940 | 7/1982 | Williams et al. | 364/745 |
| 4,500,911 | 2/1985 | Ninomiya et al. | 358/36 |

FOREIGN PATENT DOCUMENTS 2067872  7/1981  United Kingdom ................. 358/31

OTHER PUBLICATIONS

"Comb Filter Improvement with Spurious Chroma Deletion"—Kaiser; pp. Jan. 1–5, 5, 1977, SMPTE Journal (vol. 86, No. 1).

Primary Examiner—James J. Groody
Assistant Examiner—Michael P. Dunnam
Attorney, Agent, or Firm—Eugene M. Whitacre; Paul J. Rasmussen; William H. Meagher

[57] ABSTRACT

In a color TV receiver, a first digital signal of "m" bits represents high frequency component of combed luminance signal, and a second digital signal of "m" bits represents combed chrominance component. The "k" most significant bits of the first signal (where "k" is less than "m") are fed to respective inputs of a first "or" gate, while the "j" most significant bits of the second signal (where "j" is less than, or equal to, "m") are fed to respective inputs of a second "or" gate. The "or" gate outputs are fed, without delay difference, to inputs of a first "and" gate, and are fed, with a delay difference of 90° at color subcarrier frequency, to inputs of a second "and" gate. Sequence recognition apparatus, responsive to the outputs of both "and" gates, develops a correlation indication in response to existence of predetermined sequences of outputs from one or both "and" gates. Control signal former, responsive to correlation indication, forms control signal for actuating high frequency component suppression in receiver's luminance channel to preclude hanging dot display.

10 Claims, 1 Drawing Figure

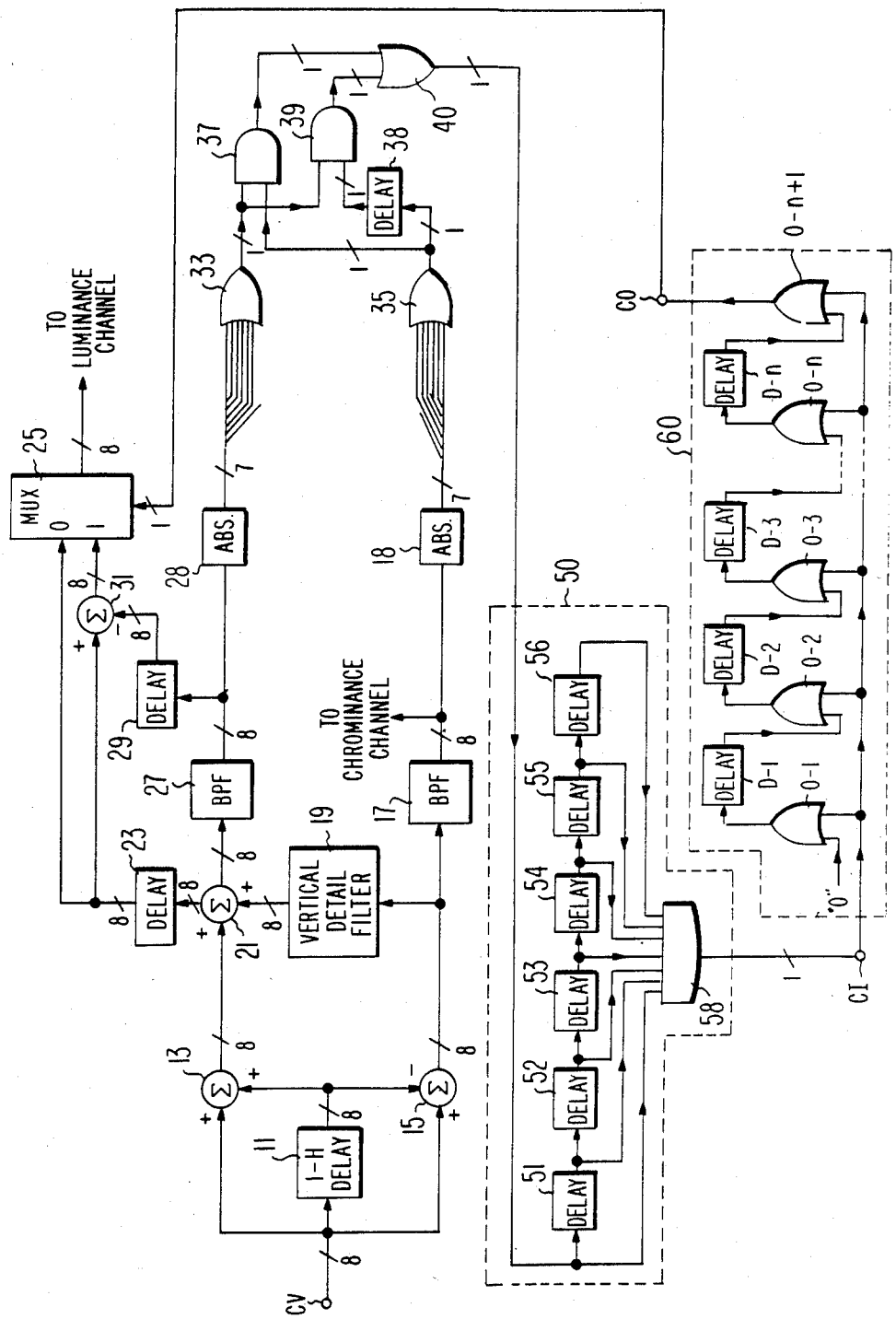

DIGITAL CORRELATION INDICATOR AND HANGING DOT REDUCTION SYSTEM EMPLOYING SAME

This invention relates generally to circuits for processing video signals in digital format, and particularly to a digital signal correlation indicator, and to a system for utilizing such a correlation indicator to effect reduction of picture disturbances of the so-called "hanging dot" type that may be associated with employment of a comb filter for separation of the luminance and chrominance components of composite video signals in a color television receiver.

The success of the separation function performed by typical forms of comb filters in color television receivers is dependent upon the existence of redundancy of picture information in adjacent regions of successive scan lines. For picture areas where a transition in the direction of field scanning (hereinafter referred to as a vertical transition) occurs, the difference in picture information in adjacent regions of sucessive scan lines can result in imperfect performance of the separation function, with one consequence being the appearance of a chrominance component in the luminance signal output of the comb filter. If not removed, the interloping chrominance component will be reproduced as "hanging dots", i.e., as an undesirable array of dots extending across the region of the vertical transition in the displayed picture.

U.S. Pat. No. 4,241,363 illustrates one prior art approach to the detection of "hanging dot" occurrences, wherein the indication of such an occurrence is developed by a signal multiplier responsive to chrominance signal and high frequency luminance signal outputs of comb filter apparatus.

As recognized in a copending U.S. patent application No. 724,647 entitled "Hanging Dot Reduction System" and concurrently filed herewith, the signal multiplier apparatus of the aforesaid patent serves as a correlation indicator, relying upon a recognition of correlation between signal components in the respective outputs of the comb filter apparatus to identify "hanging dot" occurrences. For certain types of vertical transitions, such as transitions between colored and uncolored areas, the disclosed apparatus of said patent can provide a reliable identification of "hanging dot" occurrences.

However, as additionally recognized in the aforesaid copending patent application, the disclosed apparatus of the aforesaid patent fails in its role of identification of "hanging dot" occurrences in instances of certain vertical transitions between areas of different colors. For example, for certain transitions of this type, the interloping chrominance component appearing in the high frequency luminance signal output of the comb filter apparatus bears a substantially quadrature phase relationship to the chrominance component appearing in the chrominance signal output of the comb filter apparatus. In such an instance, the signal multiplier of the aforesaid patent fails to develop an indication of a "hanging dot" occurrence, and, as a result, an undesired dot array will be subject to display in the vertical transition region.

Pursuant to the principles of the invention disclosed in the aforesaid copending patent application, the identification of "hanging dot" occurrences is desirably carried out by apparatus employing a pair of correlation indicators: (a) one correlation indicator being responsive to inputs comprising chrominance signal and high frequency luminance outputs derived without difference in delay from the comb filter apparatus, and (b) another correlation indicator being responsive to inputs comprising chrominance signal and high frequency luminance outputs derived with a relative delay difference from the comb filter apparatus, the delay difference substantially corresponding to one-quarter of the length of a period at the nominal subcarrier frequency associated with the chrominance component. Through reliance upon the development of an output by either (or both) of the correlation indicator pair to identify "hanging dot" occurrences, a more reliable "hanging dot" identifier is obtained, which avoids the quadrature relationship failure of the prior art apparatus described above. During periods of "hanging dot" identification, the luminance signal output of the comb filter is subjected to appropriate modification (e.g., high frequency component deletion) to preclude "hanging dot" display.

In the aforesaid copending patent application, each correlation indicator is illustrated as comprising a signal multiplier, a low pass filter and a voltage comparator. The signal multiplier functions to multiply the high frequency components of the respective comb filter outputs. The products of multiplication developed by the signal multiplier are filtered by the low pass filter to develop a filtered multiplier output signal, which is subject to comparison with a threshold voltage in the voltage comparator. A hanging dot occurrence indication is provided at the output terminal of the voltage comparator whenever the level of the filtered multiplier output signal exceeds the threshold voltage.

The above-described form of correlation indicator, employing a signal multiplier, is readily implemented in receivers of the analog signal processing type. Such form of correlation indicator may also be implemented in receivers of the digital signal processing type, using well known techniques for digital signal multiplication and filtering.

The present invention is concerned with novel structures for implementing the function of a correlation indicator in a digital signal processing system, whereby a hanging dot reduction system embodying the principles of the invention of the aforesaid copending patent application may be realized with significant savings in expense and complexity relative to that required if conventional digital signal multipliers were to be employed therein.

Pursuant to the present invention, an indicator of correlation between respective digital signals, of "m" bits each, representative of first and second bipolar signal components comprises: first logic circuit means, responsive to only the "k" most significant bits of said first digital signal, where "k" is less than "m"; second logic circuit means, responsive to only the "j" most signficant bits of said second digital signal, where "j" is less than or equal to "m"; an "and" gate having two inputs, one responsive to the output of said first logic circuit means and the other responsive to the output of said second logic circuit means; and correlation indication signal developing means responsive to the output of said "and" gate.

The first logic circuit means functions to output a "1" whenever the first digital signal is representative of an excursion of the first bipolar signal component, in either a positive or negative direction, which equals or exceeds a threshold determined by the "k'th" most significant bit of said first digital signal. The second logic circuit means functions to output a "1" whenever the second digital signal is representative of an excursion of the second bipolar signal component, in either a positive or negative direction, which equals or exceeds a threshold determined by the "j'th" most significant bit of said second digital signal. Illustratively, the first logic circuit means comprises a first absolute value circuit for developing a sign-independent version of said first digital signal, a first "or" gate having "k" inputs, and means for applying each of the "k" most significant bits of the output of said first absolute value circuit to a respectively different one of the inputs of said first "or" gate; while the second logic circuit means comprises a second absolute value circuit for developing a sign-independent version of said second digital signal, a second "or" gate having "j" inputs, and means for applying each of the "j" most significant bits of the output of said second absolute value circuit to a respectively different one of the inputs of said second "or" gate.

In accordance with an illustrative embodiment of the present invention, the correlation indication signal developing means of the above-described digital correlation indicator comprises: signal delay means having a plurality of successive signal takeoff points, with the amount of delay between successive ones of said takeoff points being the same, and with the input of said delay means being responsive to the output of the aforesaid "and" gate; a plurality of signal paths, each connected to a respectively different one of said signal takeoff points; a second "and" gate having a plurality of inputs equal in number to said plurality of signal paths, with each of said signal paths terminating at a respectively different one of said plurality of inputs of said second "and" gate; and a control signal former responsive to the output of said second "and" circuit.

Illustratively, the control signal former of the aforementioned combination comprises: a succession of two-input "or" gates and a plurality of delay devices (each imparting the same amount of delay), (a) with one input of each "or" gate of said succession rendered responsive to the output of the aforementioned second "and" gate, (b) with the output of each of said succession of "or" gates, with the exception of the last of said succession, being coupled via a respective one of said plurality of delay devices to the other input of the next succeeding one of said succession of "or" gates; and (c) with the control signal appearing at the output of the last of said succession of "or" gates.

In a hanging dot reduction system employing the above-described novel correlation indication structure, the first bipolar signal component, represented by said first digital signal, comprises high frequency components of a first comb filtered signal representing composite video signals subjected to a first comb filter characteristic exhibiting a plurality of response peaks at even multiples of half the line frequency of said composite signals; while the second bipolar signal component, represented by said second digital signal, comprises high frequency components of a second comb filtered signal representing composite video signals subjected to a second comb filter characteristic exhibiting a plurality of response peaks at odd multiples of half said line frequency. Means are provided for subjecting said first comb filtered signal to high frequency component removal in response to development of said control signal. Desirably, the hanging dot reduction system may additionally include: a third "and" gate having two inputs; a pair of additional signal paths respectively linking the outputs of said first and second "or" gates with the respective inputs of said third "and" gate, with said additional signal paths exhibiting a difference in delay corresponding to 90° at the color subcarrier frequency ($f_{sc}$) of the chrominance component of the composite video signals; and an additional "or" gate for delivering signals to the input of the aforementioned delay means, said additional "or" gate having a first input coupled to the output of the first-named "and" gate, and a second input coupled to the output of said third "and" gate.

In an illustrative implementation of the above-described hanging dot reduction system in a receiver employing a 4 $f_{sc}$ clocking rate for its digital signal processing circuits, each of the aforementioned plurality of delay devices imparts a delay equal to a period at 4 $f_{sc}$, while the amount of delay between successive ones of said signal takeoff points corresponds to twice a period at 4 $f_{sc}$. Desirably, the other input of the first of said succession of two-input "or" gates is effectively inactive, while the sum of the delays imparted by said plurality of delay devices exceeds the amount of delay between the first and last of said plurality of successive signal takeoff points.

In the accompanying drawing, the sole FIGURES illustrates a portion of a color television receiver incorporating a hanging dot reduction system utilizing digital signal correlation indication pursuant to an illustrative embodiment of the present invention.

In the illustrated color TV receiver apparatus, composite video signals, inclusive of a luminance component, and of a chrominance component comprising sidebands developed by the modulation of a color subcarrier $f_{sc}$, appear (in an 8-bit digital format) at a composite video signal input terminal CV and are supplied to the input of a 1-H delay line 11. The digital signal processing circuits (including the aforesaid delay line 11) of the illustrated color TV receiver are subject to clocking at a 4$f_{sc}$ rate, with the clocking signals derived from a source (not illustrated) desirably synchronized by the color burst component of the received signals in a conventional manner. The delayed signal output of delay line 11 is additively combined with signals derived directly from terminal CV in signal combiner 13, and also is subtractively combined with signals derived directly from terminal CV in signal combiner 15.

The combination of delay line 11 and the subtractive signal combiner 15 forms a first comb filter having a frequency response characteristic exhibiting a succession of response peaks at odd multiples of half the line frequency of the composite signals (interspersed with response minima at even multiples of half the line frequency). High frequency components of the output of the first comb filter, falling within the band of frequencies occupied by the chrominance component, are selectively passed by a bandpass filter 17 coupled to the output of signal combiner 15 to form a combed chrominance signal suitable for delivery to the receiver's chrominance channel.

The combination of delay line 11 and the additive signal combiner 13 forms a second comb filter having a frequency response characteristic exhibiting a succession of response peaks at even multiples of half the line frequency (interspersed with response minima at odd multiples of half the line frequency). The output of signal combiner 13 consitutes a combed luminance signal, substantially freed of chrominance component accompaniment, but also undesirably stripped of low frequency components representative of vertical detail.

Restoration of vertical detail information to the combed luminance signal is effected by an additional signal combiner 21, which additively combines the output of signal combiner 13 with the output of a vertical detail filter 19. Vertical detail filter 19 is responsive to the output of the first comb filter, accepting the output of signal combiner 15 and selectively passing low frequency components thereof falling within a frequency band below that occupied by the chrominance component.

The output of signal combiner 21 is normally employed as the signal input to the receiver's luminance channel. For this purpose, the output of signal combiner 21 is coupled via a signal delay device 23 (with a compensating function to be subsequently explained) to a first signal input terminal (0) of a multiplexer 25. In a first of the two operating states of multiplexer 25, which state exists when a "zero" appears at the multiplexer control terminal CO, the signal delivered to this first signal input terminal appears at the output of multiplexer 25 for delivery to the luminance channel. In the second of the operating states of multiplexer 25, which exists when a "one" appears at control terminal CO, the signal appearing at a second signal input terminal (1) of multiplexer 25 is instead delivered to the luminance channel.

In the second operating state of multiplexer 25, the signal delivered to the receiver's luminance channel corresponds to the output of signal combiner 21, subject, however, to removal of its high frequency components. For production of such a reduced-bandwidth signal, the illustrated apparatus includes a subtractive signal combiner 31, responsive to the output of signal combiner 21 (supplied therefrom via delay device 23) and to the output of a bandpass filter 27 (supplied therefrom via an additional delay device 29). Bandpass filter 27 is responsive to the output of signal combiner 21, and illustratively has a passband substantially identical with that of bandpass filter 17. The delay imparted to signals by delay device 23 exceeds the delay imparted by delay device 29 by an amount comparable to the signal delay introduced by bandpass filter 27, so as to align the timing of the high frequency components of the signal inputs to combiner 31 in a manner ensuring high frequency component cancellation therein.

Control of the switching of multiplexer 25 between its respective operating states is effected by a multiplexer control signal delivered to the control terminal CO by apparatus now to be described.

The illustrated control apparatus includes a first "or" gate 33 for deriving a one-bit stream of information concerning the high frequency components of the combed luminance signal passed by bandpass filter 27, and a second "or" gate 35 for deriving a one-bit stream of information concerning the combed chrominance component passed by bandpass filter 17. An absolute value circuit 28 operates upon the output of bandpass filter 27 to derive a signal representative of the absolute value (i.e., with sign independence) of the combed luminance high frequency components for application to "or" gate 33, while an absolute value circuit 18 operates upon the output of bandpass filter 17 to derive a signal representative of the absolute value (i.e., with sign independence) of the combed chrominance components for application to "or" gate 35. In a system where the outputs of the respective absolute value circuits comprise signals having "m" bits, "or" gate 33 desirably has "k" inputs, where "k" is less than "m", and "or" gate 35 desirably has "j" inputs, where "j" is less than, or equal to, "m". A plurality of signal paths of a number equal to the number of inputs for "or" gate 33 supply each of the "k" most signficant bits of the output of absolute value circuit 28 to a respectively different one of the inputs of "or" gate 33, while a plurality of signal paths of a number equal to the number of inputs for "or" gate 35 supply each of the "j" most significant bits of the output of absolute value circuit 18 to a respectively different one of the inputs of "or" gate 35.

In the system illustrated in the drawing, where m=7, an illustrative choice of 6 for both "j" and "k" is shown. Pursuant to this illustrative choice, "or" gate 33 will output a "1" whenever the output of absolute value circuit 28 reaches or exceeds a threshold level represented by the sixth most significant bit; in instances of lower signal levels, or signal absence, the presence of "0" at all of the inputs will result in a "0" output for "or" gate 33. Similarly, "or" gate 35 will output a "1" only when the output of absolute value circuit 18 reaches or exceeds the same threshold level.

The illustrated control apparatus additionally includes a pair of two-input "and" gates 37 and 39. The outputs of gates 33 and 35 are supplied directly to the inputs of "and" gate 37. While "and" gate 39 is also responsive to the outputs of gates 33 and 35, the signal delivery paths therebetween exhibit a difference in delay due to the interposition of a delay device 38 in the path from gate 35 to an input of "and" gate 39. Delay device 38 imparts a delay corresponding to 90° at the color subcarrier frequency $f_{sc}$ (i.e., corresponding to a period at the clocking frequency of $4f_{sc}$). The respective outputs of "and" gates 37 and 39 are delivered to the inputs of a two-input "or" gate 40. Gate 40 develops an output of "1" when: (1) gate 37 outputs a "1" in response to coincident development of "1" outputs by "or" gates 33 and 35, and/or (2) gate 39 outputs a "1" in response to coincidence between the delayed appearance of a "1" at the output of delay device 38, and development of a "1" output by "or" gate 33.

The output of "or" gate 40 is applied to a sequence recognizing apparatus 50, comprising delay means formed by a plurality of similar delay devices (51,52,53,54,55,56) in cascade (each imparting a delay corresponding to twice a period at the clocking frequency of 4 $f_{sc}$), and a seven-input "and" gate 58. Respective signal paths link each input of gate 58 to a different one of seven signal takeoff points associated with the delay means, with the first of the signal takeoff points located at the input of the first delay device 51 (to which the output of "or" gate 40 is applied), and with the remainder located at the respective outputs of the successive delay devices (51,52,53,54,55 and 56). Gate 58 outputs a "1" (at terminal CI) as an indication of an occurrence of hanging dots only upon the simultaneous appearance of a "1" at each of the seven successive signal takeoff points.

Control signal forming apparatus 60, responsive to the signal appearing at terminal CI comprises a plurality of like signal delay devices ("n" in number: D−1,D2,D−3 ... D−n), each imparting a delay corresponding to a period at the clocking frequency of 4 $f_{sc}$, and a succession of two-input "or" gates ("n+1" in number: O−1,O−2,O−3 ... O−n, O−n+1). The signal appearing at terminal CI is supplied to one input of each of the succession of "or" gates (O−1,O−2, etc.). The output of each of the succession of "or" gates (O−1,O−2, etc.), with the exception of the last (O−n+1) of said succession, is coupled via a respective one of said plurality of delay devices (D−1, D−2, etc.) to the other input of the next succeeding one of said succession. The other input of the first (O−1) of said succession of "or" gates is maintained at a "0" level. The output of the last (O−n+1) of said succession of "or" gates is delivered to terminal CO as the multiplexer control signal. Illustratively, the number "n" is selected so that the sum of the delays provided by the plurality of delay devices (D−1,D−2,D−3 ... D−n) of control signal former 60 exceeds the delay provided between the first and last signal takeoff points of the sequence recognition apparatus 50, so as to provide a desirable control signal stretching effect when hanging dot occurrences are recognized.

The magnitude of the delay imparted by the previously mentioned delay device 23 is selected to substantially match the delay associated with control signal development so as to ensure appropriate timing of the switching of operating states of multiplexer 25 relative to the timing of the hanging dot appearances in the signals being delivered to multiplexer 25. Where the aforementioned control signal stretching is employed, the delay amount for delay device 23 desirably is particularly selected to symmetrize the stretching obtained.

It may be observed that "or" gates 33,35 and "and" gate 37 cooperate with the sequence recognition apparatus 50 to form a first correlation indicator for signals derived (without difference in delay) from the respective absolute value circuits 28 and 18, while "or" gates 33,35, delay device 38, and "and" gate 39 cooperate with the sequence recognition apparatus 50 to form a second correlation indicator for signals derived (with a difference in delay) from the respective absolute value circuits 28 and 18. Switching of multiplexer 25 to an operating state resulting in high frequency component suppression for the signals delivered to the receiver's luminance channel occurs in response to an indication of correlation by either (or both) of the aforementioned correlation indicators.

To aid in an understanding of the operation of the illustrated system, several different examples of vertical transitions introducing a hanging dot problem will be considered below. For convenience of explanation, it will be assumed that the nature of control of the 4 $f_{sc}$ clocking signal source (not illustrated) for the digital signal processing circuits of the illustrated receiver is such that the successively clocked samples of the composite video signals appearing at terminal CV coincide with +I,+Q,−I,−Q phases of the chrominance component.

EXAMPLE 1

The vertical transition is such that a chrominance component appears with appreciable magnitude in the outputs of both bandpass filters (27,17) at the same I phase. A 1-0-1-0, etc. sequence appears at the output of "and" gate 37, while "and" gate 39 outputs a 0-0-0-0, etc. sequence. The delivery of seven successive alternate samples at the "1" level to apparatus 50 from gate 37 will trigger a correlation indication by apparatus 50, and switching of multiplexer 25 to a dot-removing mode of operation will ensue. Due to the above-discussed stretching action, the duration of the dot-removing mode can exceed the period of sequence existence to a suitable degree ensuring dot removal during transient edge periods.

EXAMPLE 2

The vertical transition is such that a chrominance component appears with appreciable magnitude in the outputs of both bandpass filters (27,17), but at the I phase in the output of bandpass filter 27 and at a phase in quadrature therewith (i.e., at the Q phase) in the output of bandpass filter 17. In this instance, the output of "and" gate 37 (exhibiting a 0-0-0-0 sequence) will not trigger a correlation indication. However, a 1-0-1-0, etc. sequence appears at the output of "and" gate 39 to enable a correlation indication and appropriate switching of multiplexer 25.

EXAMPLE 3

The vertical transition is such that a chrominance component appears with appreciable magnitude in the outputs of both bandpass filters (27,17), but at the I phase in the output of bandpass filter 27 and at a phase shifted 45° therefrom in the output of bandpass filter 17. In this instance, both of the "and" gates 37 and 39 output a 1-1-1-1, etc. sequence, whereby both enable a correlation indication and appropriate switching of multiplexer 25.

The illustrative requirement for existence of a sequence of seven alternate samples at the "1" level to confirm existence of an interloping chrominance component in the combed luminance signal is consistent with the minimum duration of a chrominance component dictated by the limited bandwidth thereof, and enhances protection against misinterpreting the signal produced at a sharp luminance edge as a hanging dot occurrence requiring elimination.

The number of bits subject to elimination at the inputs of "or" gate 33 constitutes a threshold selection facility, with the number choice related to the hanging dot level viewed as tolerable and not requiring elimination. A different threshold choice may be associated with the bit elimination at the inputs of "or" gate 35, if desired.

In the illustrated arrangement, use of the absolute value circuit 28, for example, permits the associated "or" gate 33 to perform the same threshold test for both the positive and negative swings of the high frequency components passed by bandpass filter 27. It will be appreciated that other implementations, wherein the positive and negative swings of the bandpass filter output are subject to scrutiny in separate, parallel channels, are also feasible. It should also be noted that each of the signal combiners (13,15,21,31) of the illustrated arrangement desirably incorporates a divide-by-two operation at its output for conventional dynamic range maintenance purposes.

What is claimed is:

1. In a video signal processing apparatus including a source of a first digital signal of "m" bits representative of a first bipolar signal component, and a second digital signal of "m" bits representative of a second bipolar signal component, a digital correlation indicator comprising:

first logic circuit means, responsive to only the "k" most significant bits of said first digital signal, where "k" is less than "m", for outputting a "1" whenever said first digital signal is representative of an excursion of said first bipolar signal component, in either a positive or a negative direction, which equals or exceeds a threshold determined by the "k'th" most significant bit of said first digital signal;

second logic circuit means, responsive to only the "j" most significant bits of said second digital signal, where "j" is less than or equal to "m", for outputting a "1" whenever said second digital signal is representative of an excursion of said second bipolar signal component, in either a positive or a negative direction, which equals or exceeds a threshold determined by the "j'th" most significant bit of said second digital signal;

an "and" gate having two inputs, one responsive to the output of said first logic circuit means and the other responsive to the output of said second logic circuit means and correlation indication signal developing means responsive to the output of said "and" gate.

2. Apparatus in accordance with claim 1 wherein said correlation indication signal developing means includes:

signal delay means having a plurality of successive signal takeoff points; the amount of delay between successive ones of said takeoff points being the same; the input of said delay means being responsive to the output of said "and" gate;

a plurality of signal paths, each connected to a respectively different one of said signal takeoff points;

a second "and" gate having a plurality of inputs equal in number to said plurality of signal paths, each of said signal paths terminating at a respectively different one of said plurality of inputs of said second "and" gate; and a control signal former responsive to the output of said second "and" gate.

3. Apparatus in accordance with claim 2 wherein said control signal former includes a succession of two-input "or" gates and a plurality of delay devices, with one input of each "or" gate of said succession rendered responsive to the output of said second "and" gate, with the output of each of said succession of "or" gates, with the exception of the last of said succession, being coupled via a respective one of said plurality of delay devices to the other input of the next succeeding one of said succession of "or" gates, and with said control signal appearing at the output of the last of said succession of "or" gates wherein each of said delay devices imparts the same amount of delay.

4. A digital correlation indicator in accordance with claim 3, for use in a color television receiver employing a system for processing composite color television signals appearing in a digital format, said composite color television signals being inclusive of a luminance signal component and a chrominance signal component comprising sidebands developed by the modulation of a color subcarrier of a frequency $f_{sc}$, said system including comb filter apparatus for developing a first comb filtered signal representing composite signals subjected to a first comb filter characteristic exhibiting a plurality of response peaks at even multiples of half the line frequency of said composite signals, and a second comb filtered signal representing composite signals subjected to a second comb filter characteristic exhibiting a plurality of response peaks at odd multiples of half said line frequency; wherein said first bipolar signal component comprises high frequency components of said first comb filtered signal and said second bipolar signal component comprises high frequency components of said second comb filtered signal.

5. Apparatus in accordance with claim 4 also including means for subjecting said first comb filtered signal to high frequency component removal in response to development of said control signal.

6. Apparatus in accordance with claim 5 wherein said signal processing system is subject to clocking at a 4 $f_{sc}$ rate, wherein each of said delay devices imparts a delay equal to a period at $4f_{sc}$, and wherein the amount of delay between successive ones of said signal takeoff points corresponds to twice a period at 4 $f_{sc}$.

7. Apparatus in accordance with claim 6 including a third "and" gate having two inputs, a pair of additional signal paths respectively linking the outputs of said first and second logic circuit means with the respective inputs of said third "and" gate, said additional signal paths exhibiting a difference in signal delay corresponding to a period at $4f_{sc}$; the input of said delay means being additionally responsive to the output of said third "and" gate.

8. Apparatus in accordance with claim 7 wherein the input of said delay means receives signals from the output of an additional "or" gate, said additional "or" gate having a first input coupled to the output of said first-named "and" gate, and a second input coupled to the output of said third "and" gate.

9. Apparatus in accordance with claim 8 wherein the other input of the first of said succession of two-input "or" gates is effectively inactive.

10. Apparatus in accordance with claim 9 wherein the sum of the delays imparted by said plurality of delay devices exceeds the amount of delay between the first and last of said plurality of successive signal takeoff points.

* * * * *